(12) United States Patent
Venturati

(10) Patent No.: US 10,488,024 B2
(45) Date of Patent: Nov. 26, 2019

(54) LIGHTING FIXTURE AND RELATED CONTROL METHOD

(71) Applicant: CLAY PAKY S.p.A., Seriate (IT)

(72) Inventor: Carlo Venturati, Cividate al Piano (IT)

(73) Assignee: CLAY PAKY S.P.A., Seriate (IT)

( * ) Notice: Subject to any disclaimer, the term of this patent is extended or adjusted under 35 U.S.C. 154(b) by 124 days.

(21) Appl. No.: 15/295,698

(22) Filed: Oct. 17, 2016

(65) Prior Publication Data

US 2017/0108200 A1   Apr. 20, 2017

(30) Foreign Application Priority Data

Oct. 19, 2015  (IT) .................. 102015000063062

(51) Int. Cl.
| | |
|---|---|
| F21V 21/14 | (2006.01) |
| F16H 25/20 | (2006.01) |
| F21V 14/06 | (2006.01) |
| G01D 5/14 | (2006.01) |
| G01D 5/20 | (2006.01) |

(Continued)

(52) U.S. Cl.
CPC .......... *F21V 21/14* (2013.01); *F16H 25/2015* (2013.01); *F21V 14/06* (2013.01); *F21V 21/15* (2013.01); *F21V 23/0492* (2013.01); *G01D 5/04* (2013.01); *G01D 5/142* (2013.01); *G01D 5/145* (2013.01); *G01D 5/20* (2013.01); *H02K 11/215* (2016.01); *H02K 11/225* (2016.01); *F16H 2025/2081* (2013.01); *F21W 2131/406* (2013.01); *H02K 7/06* (2013.01); *H02K 11/25* (2016.01)

(58) Field of Classification Search
CPC .......... F21V 21/14; F21V 14/06; F21V 21/15; F21V 23/0492; F21V 14/00; F21V 14/02; F21V 23/0442; F21V 23/0457; H02K 11/215; H02K 11/225; H02K 11/25; H02K 7/06; F16H 25/2015; F16H 2025/2081; G01D 5/04; G01D 5/142; G01D 5/145; G01D 5/20; F21W 2131/406

USPC ........................................................ 362/418

See application file for complete search history.

(56) References Cited

U.S. PATENT DOCUMENTS 5,758,955 A * 6/1998 Belliveau ................ F21S 10/00
                                                      362/293
9,217,559 B2 * 12/2015 Rasmussen ............. F21V 21/15

(Continued)

FOREIGN PATENT DOCUMENTS

| EP | 2 103 864 | 9/2009 |
|---|---|---|
| WO | WO 2010/117216 | 10/2010 |
| WO | WO 2013/139338 | 9/2013 |

*Primary Examiner* — Bao Q Truong
(74) *Attorney, Agent, or Firm* — Leason Ellis LLP

(57) ABSTRACT

A lighting fixture comprising:
at least one movable element;
at least one rotary actuator coupled to the movable element to move the movable element;
a position sensor comprising a linear transducer coupled to the rotary actuator and comprising a slider; wherein the linear transducer is configured to move the slider along a path by a displacement proportional to an angular displacement of the rotary actuator; the position sensor comprising a detection module for detecting the position of the slider along the path; the position sensor being configured to calculate the absolute displacement of the movable element based on the detected position of the slider along the path; preferably the path extending along an axis.

38 Claims, 3 Drawing Sheets

(51) Int. Cl.
  *F21V 21/15*   (2006.01)
  *F21V 23/04*   (2006.01)
  *G01D 5/04*    (2006.01)
  *H02K 11/215*  (2016.01)
  *H02K 11/225*  (2016.01)
  *F21W 131/406* (2006.01)
  *H02K 7/06*    (2006.01)
  *H02K 11/25*   (2016.01)

(56) References Cited

U.S. PATENT DOCUMENTS

2009/0027785 A1 *  1/2009  Tanaka ............... G01D 5/34715
                                                              359/824
2012/0139395 A1    6/2012  Dietrich

* cited by examiner

LIGHTING FIXTURE AND RELATED CONTROL METHOD

CROSS-REFERENCE TO RELATED PATENT APPLICATIONS

The present application claims the benefit of priority under 35 U.S.C. § 119 of Italian patent application serial No. 102015000063062, filed Oct. 19, 2015, which is hereby incorporated by reference in its entirety.

TECHNICAL FIELD

The present invention relates to a lighting fixture and in particular a stage projector.

A stage projector is employed in the entertainment industry to achieve spectacular effects by using light beams.

BACKGROUND OF THE INVENTION

Generally, a lighting fixture comprises at least one movable element; a lighting unit for generating a light beam; at least one rotary actuator for moving the at least one movable element; and at least one rotary actuator driving circuit for driving the electric motor. The movable element can be defined by a head of the lighting fixture, which houses the lighting unit and which is moved by two rotary actuators, one for the pan movement and another for the tilt movement; or it can be defined by another element housed within the head and movable with respect to the head thanks to a rotary actuator, e.g. the movable element can be a zoom lens housed in the head of the projector and movable along a zoom axis with respect to the lighting unit under the action of a rotary actuator.

Moreover, the lighting fixture includes driving units of the rotary actuator and a control unit of the rotary actuator coupled to the driving units to control the movements of the rotary actuator and of the associated movable element. The lighting fixture further comprises a detector configured to detect the position of the movable element and coupled to the control unit to control the movements of the movable element.

A lighting fixture of this type is shown in the document WO 2013/139338.

Unfortunately, the lighting fixture shown in the above document is expensive and complex. Moreover, a further disadvantage is that the prior art lighting fixture requires a reset procedure of the movable element position at each switching on, and accordingly requires the use of mechanical locking devices to ensure that the movable element is not hit during the reset procedure.

SUMMARY OF THE INVENTION

It is therefore an object of the present invention to provide a lighting fixture to achieve spectacular effects having less drawbacks than those of the prior art.

The present invention therefore provides a lighting fixture to achieve spectacular effects comprising:
at least one movable element;
at least one rotary actuator coupled to the movable element to move the movable element;
a position sensor comprising a linear transducer coupled to the rotary actuator and comprising a slider; in which the linear transducer is configured to move the slider along a path by a linear displacement proportional to an angular displacement of the rotary actuator; the position sensor comprising a detection module for detecting the position of the slider along the path; the position sensor being configured to calculate the absolute displacement of the movable element based on the detected position of the slider along the path; preferably the path extending along an axis.

Thanks to the present invention, the position sensor monitors the displacement of the movable element associated with the rotary actuator even when it is not electrically powered. In fact, when the position sensor is powered, it provides a measurement that takes into account the displacement occurred when the lighting fixture is powered and the displacement occurred when the lighting fixture is not powered. In this way, the position of the movable element can be continuously monitored with no need of a continuously active power supply. Moreover, the lighting fixture does not require a reset procedure.

Thanks to the present invention, the lighting fixture is lighter and more economical because it does not require mechanical locking devices for the movable element. In other words, the lighting fixture does not need any mechanical locking device, which would limit the excursion of the movable element thus avoiding a collision. In fact, in this case the movable element excursion can be limited by suitably configuring a control unit of the lighting fixture. Thanks to the present invention, the position sensor does not require an auxiliary power supply when the lighting fixture is off to monitor the displacement of the movable element.

According to a preferred embodiment of the present invention, the linear transducer is of the passive type, preferably the linear transducer does not require a power supply.

According to a preferred embodiment of the present invention, the movable element is a head that rotates about a pan or a tilt axis under the action of the rotary actuator.

According to another preferred embodiment of the present invention, the linear transducer comprises a toothed wheel coupled to the rotary actuator; preferably, the toothed wheel is integral with a rotor of the rotary actuator.

According to another preferred embodiment of the present invention, the slider is at least partially defined by a worm screw coupled to the toothed wheel.

According to another preferred embodiment of the present invention, the detection module is coupled to the slider to detect the position of the slider along the path.

According to another preferred embodiment of the present invention, the detection module comprises an inductor assembly at least partially developed about the path; the slider comprising at least one portion made of ferromagnetic material configured to slide along the path within the inductor assembly.

According to another preferred embodiment of the present invention, the inductor assembly comprises a first inductor and a second inductor; the first inductor encloses the slider; the slider sliding axially within the second inductor to take a variable position along the path of the second inductor.

According to another preferred embodiment of the present invention, the inductance sensor calculates the inductance value of the first inductor and the inductance value of the second inductor; the position sensor calculates the position along the path of the slider based on the ratio between the inductance value of the second inductor and the inductance value of the first inductor.

According to another preferred embodiment of the present invention, the inductance sensor calculates the inductance value of the first inductor and the inductance value of the second inductor, and the position sensor determines the position along the path of the slider based on the ratio between the inductance value of the second inductor and the inductance value of the first inductor.

According to another preferred embodiment of the present invention, the position sensor calculates an absolute position of the movable element based on the position of the slider along the path.

According to another preferred embodiment of the present invention, the position sensor calculates the angular position of the rotary actuator based on the slider position along the path.

According to another preferred embodiment of the present invention, the position sensor calculates a number of complete revolutions of the rotary actuator based on the position of the slider along the path.

According to another preferred embodiment of the present invention, the position sensor calculates the direction of rotation of the rotary actuator based on the position of the slider along the path.

According to another preferred embodiment of the present invention, the rotary actuator is an electric motor.

According to another preferred embodiment of the present invention, the angular position sensor is an absolute angular position sensor and is configured to detect the absolute angular position of the rotary element.

According to another preferred embodiment of the present invention, the lighting fixture comprises a control unit coupled to the detection module and configured to receive the absolute position of the movable element from the detection module.

According to another preferred embodiment of the present invention, the detection module comprises detecting elements of inductive, capacitive, optical, or magnetic type configured to measure the position of the slider along the axis.

According to another preferred embodiment of the present invention, the position sensor comprises a further angular sensor that directly detects the absolute angular position of the rotary actuator; the position sensor calculates the absolute position of the movable element based on the position of the slider along the path and on the measurement of the further angular sensor.

According to a preferred embodiment of the present invention, the further angular sensor comprises a magnet integral with a rotor of the rotary actuator and a magnetic sensor that detects the angular position of the magnet; preferably the magnetic sensor faces the magnet; preferably the magnetic sensor is a Hall sensor.

According to a preferred embodiment of the present invention, the position sensor comprises a temperature sensor configured to detect a temperature value; the position sensor defines the absolute position of the movable element based on the inductance value of the inductor assembly and based on the temperature value detected by the temperature sensor.

According to a preferred embodiment of the present invention, the movable element is configured to move along a further path between a first initial position and a first final position; the slider is configured to move along the path between a second initial position associated with the first initial position and a second final position associated with the second final position.

Another object of the present invention is to provide a control method of a lighting fixture to achieve spectacular effects which reduces the drawbacks of the prior art.

According to an embodiment, it is provided a control method of a lighting fixture; the lighting fixture comprising: at least one movable element; at least one rotary actuator coupled to the movable element to move the movable element; the control method comprising the steps of moving a slider along a path by a linear displacement proportional to the angular displacement of the rotary actuator; detecting the position of the slider along the path; and calculating the angular displacement of the rotary actuator based on the detected slider position.

BRIEF DESCRIPTION OF THE DRAWINGS

Further characteristics and advantages of the present invention will become clear from the following description of non-limiting embodiments, with reference to the figures of the accompanying drawings, in which.

DETAILED DESCRIPTION OF THE INVENTION

Figure 1:
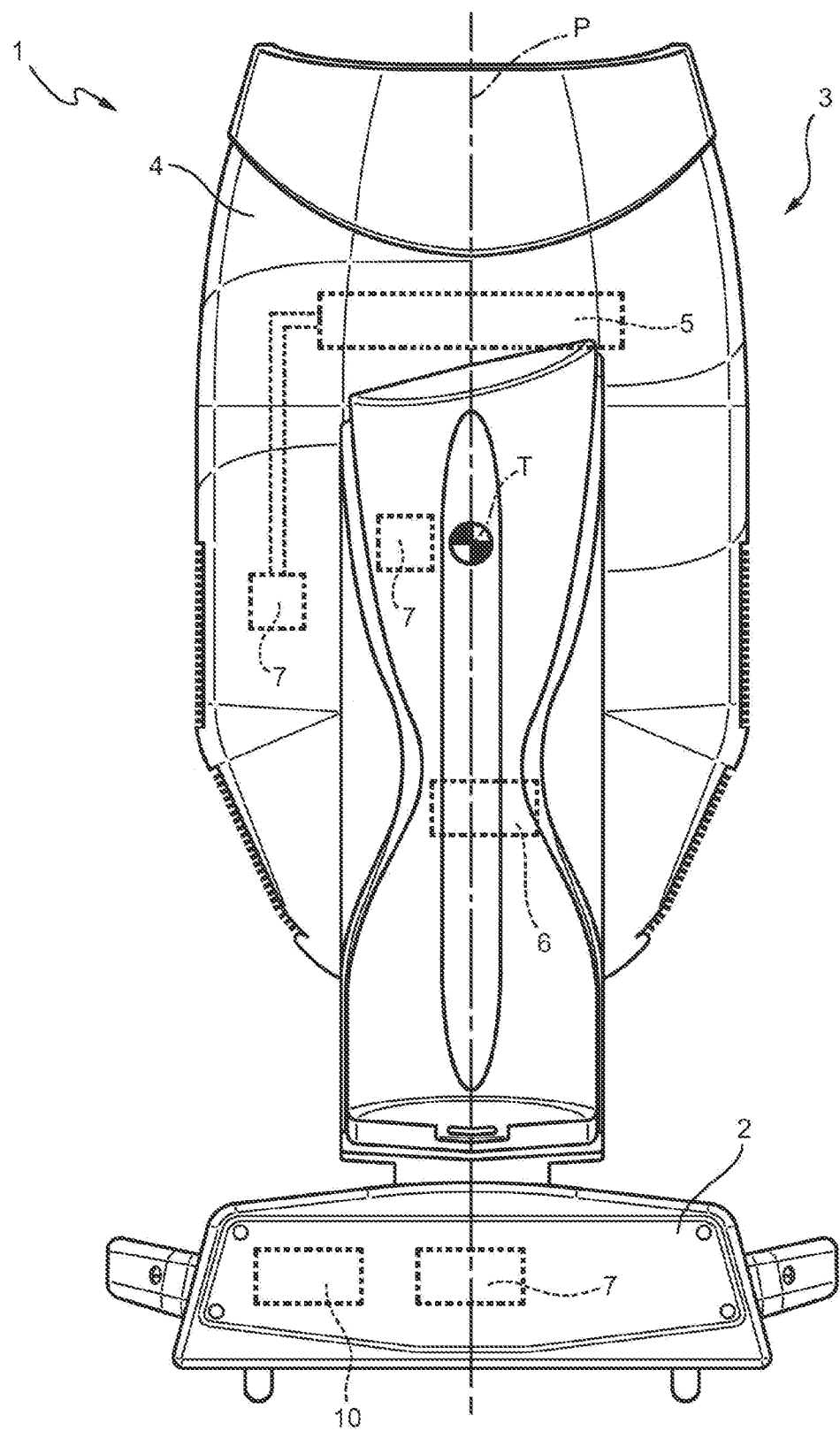
FIG. 1 is a side view, with parts removed for clarity's sake, of a lighting fixture to achieve spectacular effects according to the present invention.

FIG. 1 indicates with the reference number 1 a lighting fixture to achieve spectacular effects comprising a base 2; a plurality of movable elements 3; a lighting unit 6 (FIG. 2) for generating a light beam along an optical axis; a plurality of rotary actuators 7 for moving the movable elements 3; a plurality of driving circuits 8 connected to the rotary actuators 7; a position sensor 9 (FIG. 2) for each rotary actuator 5 and a control unit 10. Each movable element 3 is configured to move along an axis or to rotate about an axis between a first initial position and a first final position. The movable elements 3 are defined, for example, by a head 4, which rotates relative to a base 2 and which houses the lighting unit 6, or by a zoom lens 5 housed in the head 4, which moves with respect to the lighting unit 6.

Figure 2:
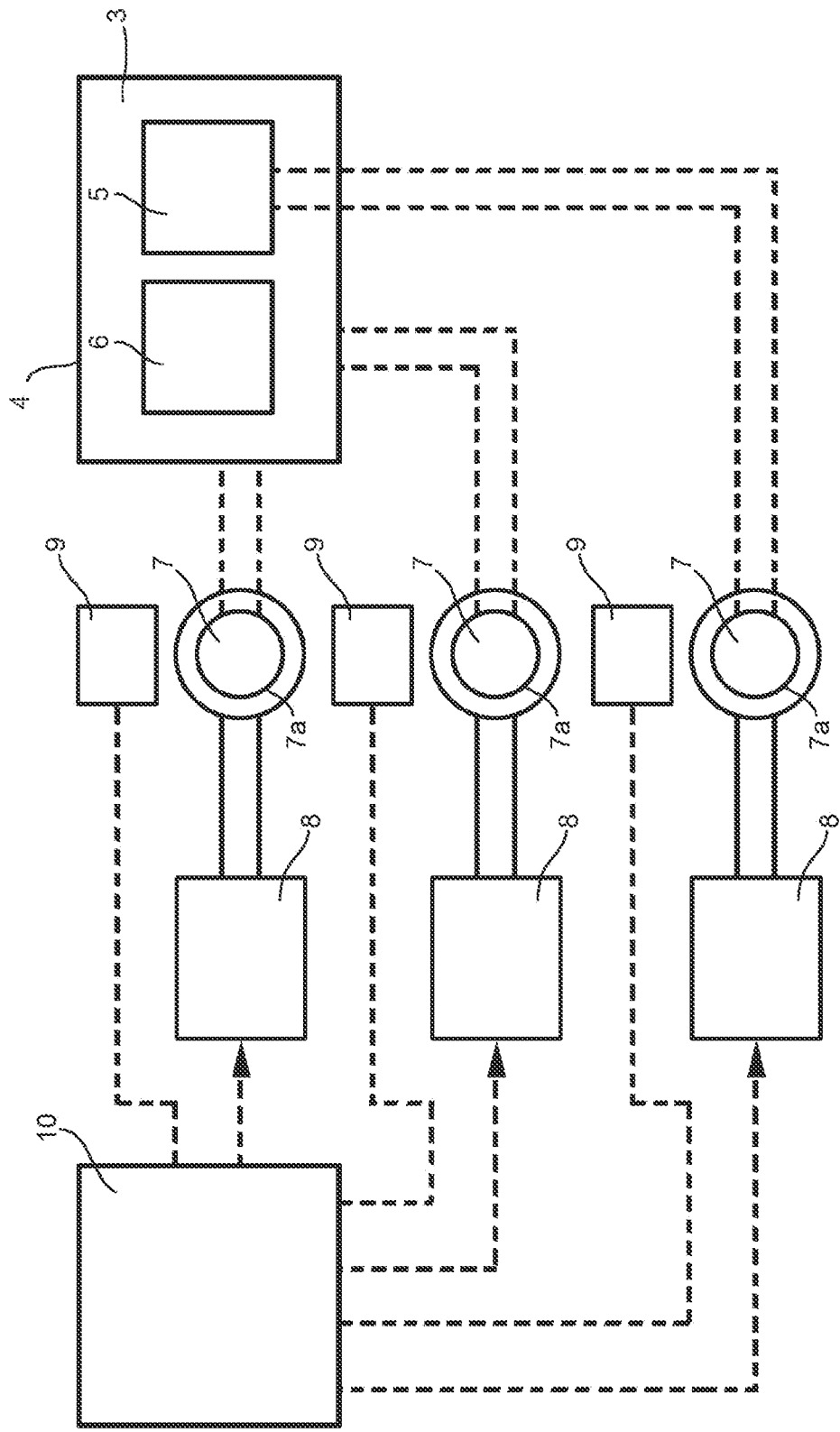
FIG. 2 is a schematic view, with parts removed for clarity's sake, of a detail of the lighting fixture of FIG. 1.

With reference to FIGS. 1 and 2, the head 4 is mechanically coupled to two of the rotary actuators 7 to rotate, respectively, about a pan axis P and a tilt axis T.

In the embodiment shown in the attached figures, the rotary actuators 7 are electric motors 7 having a rotor 7a.

The electric motors 7 can be of any type. In a preferred but non-limiting embodiment of the present invention, the electric motors 7 have permanent magnets. In more detail, the electric motors 7 are of the stepper type.

With reference to FIG. 2, each position sensor 9 is coupled to the respective electric motor 7 and in particular to the rotor 7a of the respective electric motor 7 and is a position sensor 9 configured to detect the angular position of the rotor 7a, the number of complete revolutions and the direction of rotation and to define the absolute position of the movable element 3 associated with the respective rotary actuator 7.

The position sensor 9 is coupled to the control unit 10 and is configured to provide the absolute position of the movable element 3 associated with the respective rotary actuator to the control unit 10. In more detail, the position sensor 9, associated with the rotary actuator 7 configured for rotating the head 4 about the pan axis P or the tilt axis T, provides the control unit 10 with the absolute angular position of the head 4 about the pan axis P or the tilt axis T. The position sensor 9, associated with the rotary actuator 7 configured to move the zoom lens 5 along a zoom axis, provides the control unit 10 with the linear absolute position of the lens 5 along the zoom axis.

In an alternative embodiment of the present invention, each position sensor 9 is configured to provide the control unit 10 with the absolute position of the respective rotor 7a, the number of complete revolutions of the respective rotor 7a and the direction of rotation. The control unit 10 for each movable element 3 obtains the absolute position of the movable element 3 based on the absolute position of the respective rotor 7a, the number of revolutions and the direction of rotation detected by the respective position sensor 9. The absolute position of the movable element 3 may be an angular position or a linear position according to the movable element 3. For example, when the considered movable element 3 is the head 4, the control unit 10 defines the position of the head 4 about the pan axis P and/or the tilt axis T based on the number of total revolutions, the direction, the absolute position and the transmission ratio between the rotors 7a of the two rotary actuators associated with the head 7 to carry out the pan and tilt movement and the head 4. If the movable element 3 is the zoom lens 5, then the absolute position is the linear position along the zoom axis.

In another embodiment, the lighting fixture 1 comprises a transmission assembly between the movable element 3 and the respective rotary actuator 7; and the position sensor 9 is associated with the transmission assembly and detects the absolute angular position of the transmission assembly, the number of complete revolutions of the transmission assembly and the direction of rotation.

Figure 3:
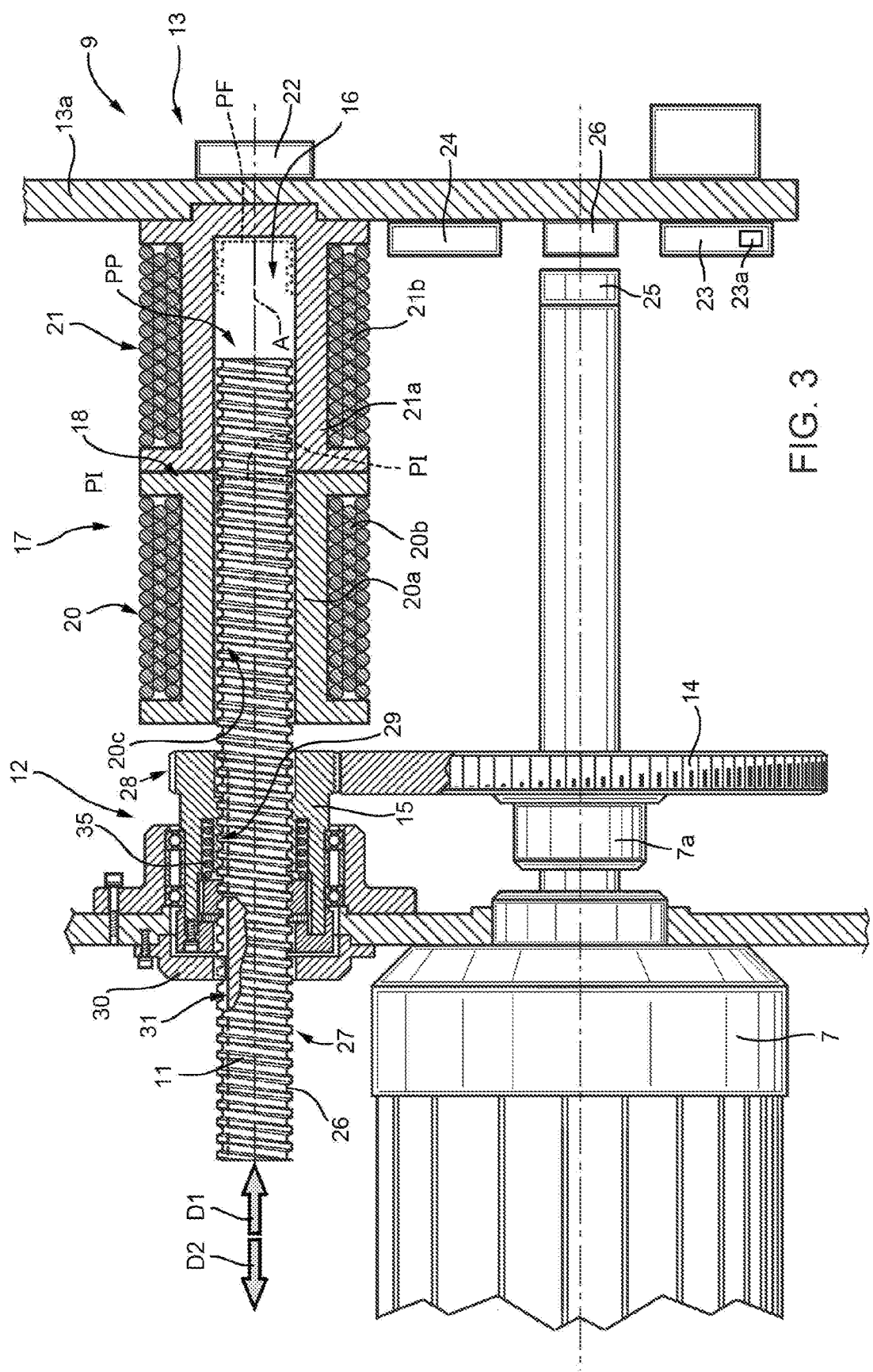
FIG. 3 is a view with parts in section and schematic parts of a detail of the lighting fixture of FIG. 1.

With reference to FIG. 3, the position sensor 9 comprises a linear transducer 12, which, in turn, comprises a slider 11 and which transduces an angular displacement of the rotary actuator 7 in a linear displacement of the slider 11 along a path PP. In a preferred embodiment shown in FIG. 2, the path PP extends along an axis A and, consequently, the slider 11 moves along the axis A. Moreover, the position sensor 9 comprises a detection module 13 coupled to the linear transducer 12 to detect the linear displacement of the slider 11. The slider 11 is configured to move along the path PP, in particular along the axis A, between a second initial position PI associated with the first initial position and a second final position PF associated with the second final position.

In more detail, the linear transducer 12 is coupled to the rotor 7a of the rotary actuator 7 and comprises a toothed wheel 14 coupled to the actuator 7. The slider 11 is at least partially defined by a worm screw coupled to the toothed wheel 14. In particular, the slider 11 has at least a portion having a thread 26 along an outer cylindrical surface 27 of the slider 11, and accordingly defines a male worm screw. The slider 11 is at least partially made of ferromagnetic material. The toothed wheel 14 is mechanically coupled to the rotor 7b and rotates along with it. The toothed wheel 14 is coupled to the slider 11, in particular to the portion that defines the worm screw and, by rotating, moves the worm screw along the path PP, in other words along the axis A in a direction D1 or in a direction D2 based on the direction of rotation. In more detail, the position sensor 7 comprises a ring 15 having an outer toothed surface 28, which is coupled directly to the toothed wheel 14, and an inner threaded surface 29, which is coupled directly to the portion of the slider 11 defining the worm screw. In other words, the ring 15 defines a female worm screw coupled to the male worm screw. In other words, the toothed wheel 14 is coupled to the male worm screw through the female worm screw. Moreover, the female worm screw is in contact with the male worm screw thanks to an elastic element 35, which pushes the ring 15 along the axis A so that the teeth of the male worm screw and the teeth of the female worm screw are fully in contact and any play between them is avoided.

Finally, the sensor 9 comprises a locking element 30, which extends radially to the axis A and the slider 11 includes a groove 31 along its outer surface, which extends along the axis A. The locking element 30 is engaged in the groove 31 to stop the rotation of the slider 11 about the axis A. In this way, the movement of rotation of the ring 15 on the male worm screw causes a linear movement along the axis A.

The detection module 13 includes a card 13a configured to house and give mechanical support to the components of the detection module 13 and to connect the components of the detection module 13.

The detection module 13 also comprises a seat 16, which extends along the axis A and houses a variable portion of the slider 11. In other words, the slider 11 moves along the axis A, occupying more or less space within the seat 16 depending on the direction of the linear displacement along the axis A.

In more detail, the detection module 13 includes an inductor assembly 17 housed on the card 13a and which extends along the axis A and comprises a spool unit 18 and a winding unit 19 wound around the spool unit 18. The spool unit 18 is constituted by a hollow element, preferably a cylinder defined about the axis A, whose interior defines the seat 16 within which the slider 11 slides axially with respect to the axis A.

In more detail, the inductor assembly 17 comprises a first inductor 20 and second inductor 21.

The first inductor 20 comprises a first spool 20a and a first winding 20b wound around the first spool 20a. The first spool 20a has a cylindrical shape and has a cavity 20c. The cavity 20c always houses the slider 11, in other words a portion of the slider 11 fills the first spool 20a, in more detail the cavity 20c, in any linear position of the slider 11.

The second inductor 21 comprises a second spool 21a and a second winding 21b wound around the second spool 21a. The second spool 21a has a cylindrical shape and has a cavity 21c. The slider 11 is housed within the cavity 21c and can take a plurality of positions ranging from the initial position PI to the final position PF. In other words, the slider occupies a different cavity portion 21c depending on the position taken along the axis A from the position PI to the position PF.

The detection module 12 further includes an inductance sensor 22 for measuring an inductance value of the inductor assembly 17 and a processing unit 23 connected to the inductance sensor 22 through the card 13a to receive the measured inductance value. In more detail, the inductance sensor 22 measures a first inductance value of the first inductor 20 and a second inductance value of the second inductor 21, and sends the inductance values to the processing unit 23. The processing unit 23 detects the position of the slider 11 along the axis A based on the ratio between the second inductance value of the second inductor 21 and the first inductance value of the first inductor 20.

Thanks to an inductor assembly 17 composed of two inductors 20 and 21, in which the first inductor 20 always encloses the slider 15, the position sensor 9 provides a more accurate measurement. Thanks to the inductor assembly 17 composed of the two inductors 20 and 21, the position sensor 9 is not affected by the temperature because the measurement derives from the ratio between two values and this compensates for the temperature variations in the inductance values of the inductors 20 and 21.

In an alternative embodiment of the present invention, the inductor assembly 17 only includes the second inductor 21 and does not include the first inductor 20. The slider 11 occupies a variable position within the second inductor 21. The position sensor 9 comprises a temperature sensor 24. Moreover, the processing unit 23 comprises a memory 23a storing the inductance values of the second inductor 21 at different temperatures. The processing unit 23 receives the temperature value from the temperature sensor 24 and the inductance value of the second inductor 21 from the inductance sensor 22. The position sensor 9 provides the absolute angular position, the number of revolutions and the direction of rotation of the rotor 7a based on the inductance value of the second inductor 21 and on the detected temperature value.

Furthermore, in a preferred but non-limiting embodiment of the present invention, the position sensor 9 comprises a magnet 25 coupled to the rotor 7a, in particular arranged on a shaft of the rotor 7a and rotating with the rotor 7a. The position sensor 9 comprises a magnetic sensor 26, in particular a Hall sensor, which detects the absolute angular position of the magnet 25 to define the absolute angular position of the rotor 7a. In particular, the Hall sensor faces the magnet. The position sensor 9 defines the angular position of the rotor 7a, the number of complete revolutions of the rotor 7a and the direction of rotation based on the slider position and the absolute angular position detected by the magnetic sensor 26. In this way, the position sensor 9 defines more precisely the absolute angular position.

In an alternative embodiment of the present invention not shown in the attached figures, the detection module 13 includes detecting elements of inductive or capacitive or optical or magnetic type to measure the linear displacement along the axis A of the slider 11.

Thanks to the present invention, the position sensor 9 monitors the angular displacement of the rotary actuator 7 even when it is not powered, and can provide the measurement of the angular displacement when it is powered. In this way, the position of the movable element 3 can be found avoiding the reset procedure at each switching on. Thanks to the present invention, the lighting fixture 1 is lighter and more economical because it does not need a mechanical locking device to limit the angular excursion of the head 2 when obstacles are present in the range of movement of the head 2, thus avoiding any collision to the head 2. Thanks to the present invention, the position sensor 9 does not require a power supply when the lighting fixture 1 is turned off to monitor the displacement of the movable element 3.

Finally, it is clear that the lighting fixture here described can be subject to modifications and variations without departing from the scope of the appended claims.

The invention claimed is:

1. A lighting fixture comprising:
    at least one movable element (3);
    at least one rotary actuator (7) coupled to the movable element (3) to move the movable element (3);
    a position sensor (9) comprising a linear transducer (12) coupled to the rotary actuator (7) and comprising a slider (11); wherein the linear transducer (12) is configured to move the slider (11) along a path (PP) by a displacement proportional to an angular displacement of the rotary actuator (7); the position sensor (9) comprising a detection module (13) to detect the position of the slider (11) along the path (PP); the position sensor (9) being configured to calculate the absolute displacement of the movable element (3) based on the detected position of the slider (11) along the path (PP); the path (PP) preferably extending along an axis (A).

2. A lighting fixture according to claim 1, wherein the linear transducer (12) is of passive type, preferably the linear transducer (12) does not require any electrical power supply.

3. A lighting fixture according to claim 1, wherein the movable element (3) is a head (4) that rotates about a pan axis (P) and/or a tilt axis (T) under the action of the rotary actuator (7).

4. A lighting fixture according to claim 1, wherein the linear transducer (12) comprises a toothed wheel (14) coupled to the rotary actuator (7); preferably the toothed wheel (14) is integral with a rotor (7a) of the rotary actuator (7).

5. A lighting fixture according to claim 4, wherein the slider (11) is at least partially defined by a worm screw coupled to the toothed wheel (14).

6. A lighting fixture according to claim 5, wherein the detection module (13) comprises an inductor assembly (17); at least a portion of the slider (11) being made of ferromagnetic material and sliding along the path (PP) within the inductor assembly (17).

7. A lighting fixture according to claim 6, wherein the detection module (13) comprises an inductance sensor (22) to measure an inductance value of the inductor assembly (17); the position sensor (9) calculates the position along the path (PP) of the slider (11) based on the measured inductance value.

8. A lighting fixture according to claim 7, wherein the inductor assembly (17) comprises a first inductor (20) and a second inductor (21); the first inductor (20) encloses the slider (11); the slider (11) sliding axially within the second inductor (21) to take a variable position along the path (PP) within the second inductor (21).

9. A lighting fixture according to claim 8, wherein the inductance sensor (22) calculates the inductance value of the first inductor (20) and the inductance value of the second inductor (21); the position sensor (9) calculates the position along the path (PP) of the slider (11) based on the ratio between the inductance value of the second inductor (21) and the inductance value of the first inductor (20).

10. A lighting fixture according to claim 1, wherein the position sensor (9) calculates, based on the position of the slider (11) along the path (PP), at least one element of the following group comprising: the angular position of the rotary actuator (7), a number of complete revolutions of the rotary actuator (7) and the direction of rotation of the rotary actuator (7).

11. A lighting fixture according to claim 1, wherein the rotary actuator (7) is an electric motor.

12. A lighting fixture according to claim 1, wherein the lighting fixture (1) comprises a control unit (10) coupled to the position sensor (9) and configured to receive the absolute position of the movable element (3) from the position sensor (9).

13. A lighting fixture according to claim 1, wherein the detection module (13) comprises detecting elements of inductive, capacitive, optical or magnetic type configured to measure the position of the slider (11) along the path (PP).

14. A lighting fixture according to claim 1, wherein the position sensor (9) comprises a further angular sensor (25, 26) that directly detects the absolute angular position of the rotary actuator (7); the position sensor (9) calculates the absolute position of the movable element (3) based on the measurement of the detection module (13) and on the measurement of the further angular sensor (25, 26); preferably, the further angular sensor (25, 26) comprises a magnet (25) integral with a rotor (7a) of the rotary actuator (7) and a magnetic sensor (26) that detects the angular position of the magnet (25); preferably the magnetic sensor (26) faces the magnet (25); preferably the magnetic sensor (26) is a Hall sensor.

15. A lighting fixture according to claim 1, wherein the position sensor (9) comprises a temperature sensor (24) configured to detect a temperature value; the position sensor (9) defines the absolute position of the movable element (3) based on the inductance value measured by the detection module (13) and based on the temperature value detected by the temperature sensor (24).

16. A lighting fixture according to claim 1, wherein the movable element (3) is configured to move along a further path between a first initial position and a first final position; the slider (11) is configured to move along the path (PP) between a second initial position (PI) associated with the first initial position and a second final position (PF) associated with the first final position.

17. A control method of a lighting fixture; the lighting fixture (1) comprising: at least one movable element (3); at least one rotary actuator (7) coupled to the movable element (3) to move the movable element (3); the control method comprising the steps of moving a slider (11) along a path (PP) by a displacement proportional to an angular displacement of the rotary actuator (7); detecting the position of the slider (11) along the path (PP); and calculating the angular displacement of the rotary actuator (7) based on the detected position of the slider (11).

18. A lighting fixture comprising:
at least one movable element (3);
at least one rotary actuator (7) coupled to the movable element (3) to move the movable element (3);
a position sensor (9) comprising a linear transducer (12) coupled to the rotary actuator (7) and comprising a slider (11); wherein the linear transducer (12) is configured to move the slider (11) along a path (PP) by a displacement proportional to an angular displacement of the rotary actuator (7); the position sensor (9) comprising a detection module (13) to detect the position of the slider (11) along the path (PP); the position sensor (9) being configured to calculate the absolute displacement of the movable element (3) based on the detected position of the slider (11) along the path (PP); the path (PP) preferably extending along an axis (A); wherein the linear transducer (12) comprises a toothed wheel (14) coupled to the rotary actuator (7); preferably the toothed wheel (14) is integral with a rotor (7a) of the rotary actuator (7); wherein the slider (11) is at least partially defined by a worm screw coupled to the toothed wheel (14); a lighting fixture according to claim 5, wherein the detection module (13) comprises an inductor assembly (17); at least a portion of the slider (11) being made of ferromagnetic material and sliding along the path (PP) within the inductor assembly (17).

19. A lighting fixture according to claim 18, wherein the detection module (13) comprises an inductance sensor (22) to measure an inductance value of the inductor assembly (17); the position sensor (9) calculates the position along the path (PP) of the slider (11) based on the measured inductance value.

20. A lighting fixture according to claim 19, wherein the inductor assembly (17) comprises a first inductor (20) and a second inductor (21); the first inductor (20) encloses the slider (11); the slider (11) sliding axially within the second inductor (21) to take a variable position along the path (PP) within the second inductor (21).

21. A lighting fixture according to claim 20, wherein the inductance sensor (22) calculates the inductance value of the first inductor (20) and the inductance value of the second inductor (21); the position sensor (9) calculates the position along the path (PP) of the slider (11) based on the ratio between the inductance value of the second inductor (21) and the inductance value of the first inductor (20).

22. A lighting fixture according to claim 18, wherein the position sensor (9) calculates, based on the position of the slider (11) along the path (PP), at least one element of the following group comprising: the angular position of the rotary actuator (7), a number of complete revolutions of the rotary actuator (7) and the direction of rotation of the rotary actuator (7).

23. A lighting fixture according to claim 18, wherein the lighting fixture (1) comprises a control unit (10) coupled to the position sensor (9) and configured to receive the absolute position of the movable element (3) from the position sensor (9).

24. A lighting fixture according to claim 18, wherein the position sensor (9) comprises a further angular sensor (25, 26) that directly detects the absolute angular position of the rotary actuator (7); the position sensor (9) calculates the absolute position of the movable element (3) based on the measurement of the detection module (13) and on the measurement of the further angular sensor (25, 26); preferably, the further angular sensor (25, 26) comprises a magnet (25) integral with a rotor (7a) of the rotary actuator (7) and a magnetic sensor (26) that detects the angular position of the magnet (25); preferably the magnetic sensor (26) faces the magnet (25); preferably the magnetic sensor (26) is a Hall sensor.

25. A lighting fixture comprising:
at least one movable element (3);
at least one rotary actuator (7) coupled to the movable element (3) to move the movable element (3);
a position sensor (9) comprising a linear transducer (12) coupled to the rotary actuator (7) and comprising a slider (11); wherein the linear transducer (12) is configured to move the slider (11) along a path (PP) by a displacement proportional to an angular displacement of the rotary actuator (7); the position sensor (9) comprising a detection module (13) to detect the position of the slider (11) along the path (PP); the position sensor (9) being configured to calculate the absolute displacement of the movable element (3) based on the detected position of the slider (11) along the path (PP); the path (PP) preferably extending along an axis (A), wherein the position sensor (9) comprises a further angular sensor (25, 26) that directly detects the absolute angular position of the rotary actuator (7); the position sensor (9) calculates the absolute position of the movable element (3) based on the measurement of the detection module (13) and on the measurement of the further angular sensor (25, 26); preferably, the further angular sensor (25, 26) comprises a magnet (25) integral with a rotor (7a) of the rotary actuator (7) and a magnetic sensor (26) that detects the angular position of the magnet (25); preferably the magnetic sensor (26) faces the magnet (25); preferably the magnetic sensor (26) is a Hall sensor.

26. A lighting fixture according to claim 25, wherein the linear transducer (12) is of passive type, preferably the linear transducer (12) does not require any electrical power supply.

27. A lighting fixture according to claim 25, wherein the movable element (3) is a head (4) that rotates about a pan axis (P) and/or a tilt axis (T) under the action of the rotary actuator (7).

28. A lighting fixture according to claim 25, wherein the position sensor (9) calculates, based on the position of the slider (11) along the path (PP), at least one element of the following group comprising: the angular position of the rotary actuator (7), a number of complete revolutions of the rotary actuator (7) and the direction of rotation of the rotary actuator (7).

29. A lighting fixture according to claim 25, wherein the lighting fixture (1) comprises a control unit (10) coupled to the position sensor (9) and configured to receive the absolute position of the movable element (3) from the position sensor (9).

30. A lighting fixture according to claim 25, wherein the movable element (3) is configured to move along a further path between a first initial position and a first final position; the slider (11) is configured to move along the path (PP) between a second initial position (PI) associated with the first initial position and a second final position (PF) associated with the first final position.

31. A lighting fixture comprising:
at least one movable element (3);
at least one rotary actuator (7) coupled to the movable element (3) to move the movable element (3);
a position sensor (9) comprising a linear transducer (12) coupled to the rotary actuator (7) and comprising a slider (11); wherein the linear transducer (12) is configured to move the slider (11) along a path (PP) by a displacement proportional to an angular displacement of the rotary actuator (7); the position sensor (9) comprising a detection module (13) to detect the position of the slider (11) along the path (PP); the position sensor (9) being configured to calculate the absolute displacement of the movable element (3) based on the detected position of the slider (11) along the path (PP); the path (PP) preferably extending along an axis (A), wherein the position sensor (9) comprises a temperature sensor (24) configured to detect a temperature value; the position sensor (9) defines the absolute position of the movable element (3) based on the inductance value measured by the detection module (13) and based on the temperature value detected by the temperature sensor (24).

32. A lighting fixture according to claim 31, wherein the linear transducer (12) is of passive type, preferably the linear transducer (12) does not require any electrical power supply.

33. A lighting fixture according to claim 31, wherein the movable element (3) is a head (4) that rotates about a pan axis (P) and/or a tilt axis (T) under the action of the rotary actuator (7).

34. A lighting fixture according to claim 31, wherein the position sensor (9) calculates, based on the position of the slider (11) along the path (PP), at least one element of the following group comprising: the angular position of the rotary actuator (7), a number of complete revolutions of the rotary actuator (7) and the direction of rotation of the rotary actuator (7).

35. A lighting fixture according to claim 31, wherein the rotary actuator (7) is an electric motor.

36. A lighting fixture according to claim 31, wherein the lighting fixture (1) comprises a control unit (10) coupled to the position sensor (9) and configured to receive the absolute position of the movable element (3) from the position sensor (9).

37. A lighting fixture according to claim 31, wherein the detection module (13) comprises detecting elements of inductive, capacitive, optical or magnetic type configured to measure the position of the slider (11) along the path (PP).

38. A lighting fixture according to claim 31, wherein the position sensor (9) comprises a further angular sensor (25, 26) that directly detects the absolute angular position of the rotary actuator (7); the position sensor (9) calculates the absolute position of the movable element (3) based on the measurement of the detection module (13) and on the measurement of the further angular sensor (25, 26); preferably, the further angular sensor (25, 26) comprises a magnet (25) integral with a rotor (7a) of the rotary actuator (7) and a magnetic sensor (26) that detects the angular position of the magnet (25); preferably the magnetic sensor (26) faces the magnet (25); preferably the magnetic sensor (26) is a Hall sensor.

* * * * *